United States Patent [19]

Deutsch et al.

[11] Patent Number: 4,508,243
[45] Date of Patent: Apr. 2, 1985

[54] SEED METER ASSEMBLY

[75] Inventors: Timothy A. Deutsch, Newton; Howard C. Hadley, Urbandale, both of Iowa

[73] Assignee: Deere & Company, Moline, Ill.

[21] Appl. No.: 463,175

[22] Filed: Feb. 3, 1983

[51] Int. Cl.³ .............................................. B67D 5/52
[52] U.S. Cl. .................................... 222/142; 222/609
[58] Field of Search ............... 222/148, 609, 610, 271, 222/272, 142; 111/64

[56] References Cited

U.S. PATENT DOCUMENTS 2,311,726 2/1943 Blue ................................. 222/609 X
2,851,200 9/1958 Foa .................................. 222/609 X
3,014,622 12/1961 Forsyth .......................... 222/609 X

OTHER PUBLICATIONS

Operator's Manual, Central Metering Seeder 665, John Deere Works, OM-N159583, issue K2.

Primary Examiner—Stanley H. Tollberg

[57] ABSTRACT

A meter assembly for a grain drill or seeder or similar implement. The meter assembly is hinged at one end to the implement and held in place by over center latches. To inspect and service the meter assembly and to empty the material containers, the latches are released allowing the meter assembly to swing down. The meter is driven by a pair of gears which automatically disengage when the meter assembly swings away from the latched working position and engage when the assembly is swung back to the working position. Removal and replacement of chains and bolts are eliminated to increase serviceability of the meter assembly.

21 Claims, 3 Drawing Figures

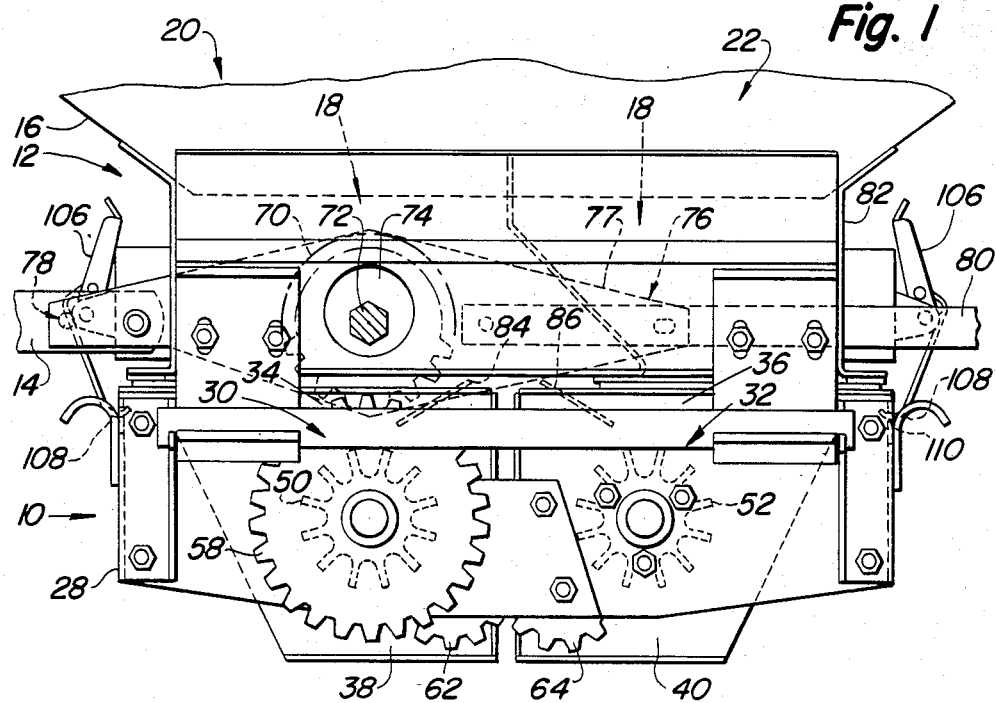

SEED METER ASSEMBLY

BACKGROUND OF THE INVENTION

The present invention relates generally to agricultural equipment and more specifically to a meter assembly for seeders and drills or the like implements.

Implements such as conventional seeders and drills commonly include one or more seed and/or fertilizer hoppers which open downwardly into a metering device which meters the material into a distribution system for placement at a preselected rate in or on the ground. The metering device typically includes a housing bolted to the hopper or implement frame, a feed gate, and one or more fluted feed rolls journalled in the housing adjacent the gate and driven by a sprocket and chain structure. The feed roll drive in turn is powered from a ground-engaging gauge wheel or other suitable device for rotating the feed rolls at a rate dependent on the ground speed of the implement. On seeders of the type employing chisel plow or field cultivator structure, such as the commercially available John Deere 665 Central Metering Seeder, the feed roll drive is engaged whenever the implement is lowered to till the soil.

The feed rolls must be periodically inspected and the flutes must be regularly cleaned to assure accurate and efficient metering. Accumulations of material in the feed roll housing, particularly caked fertilizer, also must be removed to prevent corrosion and improper metering.

Removing the metering device for cleaning and servicing is time-consuming and inconvenient because numerous mounting bolts must be removed from the feed roll housing, and once the bolts are removed, additional adjusting bolts in some models must be loosened to lower the housing to clear the bottom of the hopper. In addition, the meter drive chain must be removed. Because the task of removing the metering device is presently inconvenient and time-consuming, meter inspection and maintenance is often neglected to the detriment of the accuracy and useful life of the device.

It is therefore an object of the present invention to provide an improved meter assembly for drills and seeders or the like implements.

It is another object of the invention to provide a meter assembly which is easier to inspect and service than at least most of the previously available metering devices. It is a further object to provide such an assembly which may be supported by the implement during inspection and servicing, and while the hoppers are emptied, thereby eliminating the need for the operator to lift the entire unit from the implement.

It is a further object of the invention to provide a meter assembly which eliminates the step of removing a plurality of bolts for servicing.

It is yet another object of the invention to provide a meter assembly which can be positioned for cleaning the material containers and feed rolls without removing a meter drive chain. It is a further object to provide such an assembly wherein the drive is automatically connected during assembly and disconnected during disassembly, and wherein the assembly includes additional structure for conveniently disconnecting the drive at any time.

In accordance with the above objects, a meter assembly is provided which is hingedly connected to the implement at a first end and held in place at the opposite end by over center latches. For inspection or service, the operator releases the latches and allows the assembly to swing downwardly about the hinge pivot for easy access to the meter mechanism. The assembly includes a meter spur gear which engages a drive gear when the assembly is latched up in the working position. As the assembly is swung downwardly from the working position, the gears disengage automatically, and the step of removing a drive chain is eliminated. The gears mesh into driving relationship automatically as the meter is swung back into the working position. The drive gear shaft is journalled for rotation in a lever-mounted bearing. The lever can be positioned for removing drive from the meter even when the ground drive wheel is on the ground, for example, when the meter is utilized with a tillage implement and the operator wants to till a portion of the field without distributing seed or fertilizer. The swing drop design is easier to use than previous bolted connections, and the time required to inspect and service the meter assembly is reduced so that meter maintenance is less likely to be neglected. The meter can be dropped quickly to empty the tanks when seeding and/or fertilizing is complete. The operator will benefit because he will be able to make more efficient use of his time.

These and other objects, features and advantages of the present invention will become apparent from the description which follows and from the accompanying drawings.

BRIEF DESCRIPTION OF THE DRAWINGS

FIG. 1 is a side view of the meter assembly of the present invention as seen from the drive input side.

FIG. 2 is a front view of the meter assembly of FIG. 1.

DESCRIPTION OF THE PREFERRED EMBODIMENT

Figure 3:
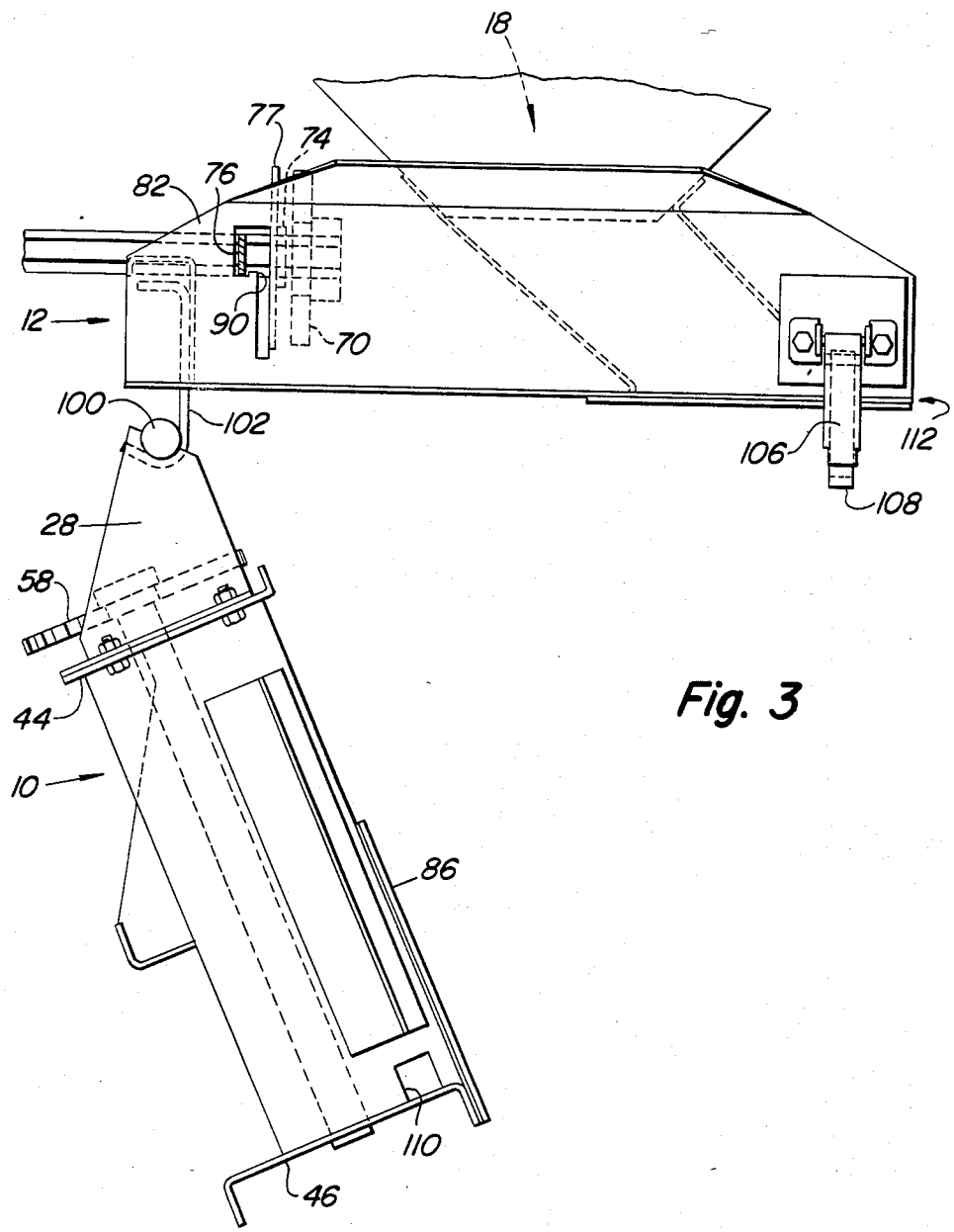
FIG. 3 is a view similar to FIG. 2, but showing the over center latches released and the meter swung downwardly into its service position.

Referring now to FIG. 1, therein is shown a meter assembly 10 connected to meter and hopper support structure 12 which in turn is bolted or otherwise connected to frame 14 of a conventional grain seeder or similar implement. A hopper 16 is supported from the implement frame 14 and includes a lower portion connected to the support structure 12 and opening downwardly into a discharge area 18 immediately above the meter assembly 10. In the preferred embodiment, the hopper 16 includes two compartments 20 and 22 for containing diverse types of material such as a seed grain and fertilizer for application at the same time. The hopper and frame structure of the seeding implement may be of the general type that is commercially available, such as on the John Deere Model 665 Central Metering Seeder, and therefore will not be described in further detail here.

The meter assembly 10 includes meter frame structure or feed roll housing 28 defining a pair of meter compartments 30 and 32 having inlet areas 34 and 36 opening upwardly into the discharge areas 18 of compartments 20 and 22, respectively.

The meter compartments 30 and 32 include outlets 38 and 40 opening into a venturi of a distributing air duct (not shown) which is selectively attachable to and removable from the lower portion of the meter assembly 10. The duct, in the preferred embodiment, is connected by a latch to flanges 42 located on opposite sides of the outlets 38 and 40.

Journalled in sidewalls 44 and 46 of the housing 28 is a pair of fluted feed rolls 50 and 52 located between the inlets 34 and 36 and the outlets 38 and 40, respectively. The feed roll 50 is driven by a drive gear 58 journalled for rotation outwardly (FIG. 2) of the wall 44. The gear 58 drives the feed roll 50 and a pair of meshing idler gears 62 and 64 which in turn rotate the feed roll 52. When the meter assembly 10 is in the position shown in FIGS. 1 and 2, the gear 58 meshes with a drive gear 70 connected for rotation with one end of a drive shaft 72 which is rotatably supported on the hopper support structure 12. The opposite end of the drive shaft 72 is connected to conventional chain drive structure (not shown) which in the preferred embodiment is driven by a ground wheel at a rate proportional to the forward speed of the implement over the ground. The drive shaft 72 is journalled in a bearing 74 mounted on an adjustable handle member 76. The handle member 76 includes a bearing support plate 77 pivotally connected at location 78 to the left side (as viewed in FIG. 1) of the hopper support structure 12 and a grip portion 80 connected to the plate 72 and extending outwardly through panel 82 in the right side of the structure 12. The grip portion 80 can be lifted from the position shown in FIG. 1 to move the bearing 74 and thus the right side of the drive shaft 72 generally transversely with respect to the axis of the shaft. There is sufficient play in the drive shaft 72 to permit the drive gear side of the shaft to be raised so that the gears 58 and 70 disengage. The handle member 76 can be can be locked in the disengaged position by moving grip portion 80 to the left (FIG. 3) in a slot 90 provided in the panel 82. Alternatively, the member 76 may be locked in either the operative (FIG. 1) or the inoperative (FIG. 3) position by inserting a pin through the handle and through a bracket (not shown) connected to the panel 82 adjacent the handle. The meter may be disengaged even while the chain drive is connected and the gauge wheel is in rolling contact with the ground.

During operation, the material in the compartments 20 and 22 is funneled downwardly to the discharge area 18 where it is directed by panel structure 84 and 86 to the feed rolls 50 and 52. The drive gear 70 rotates the gear 58, and the feed rolls 50 and 52 are driven to meter the materials to the outlets 38 and 40. The material drops into the venturi of the air distribution system. If the operator wishes to discontinue the seeding and/or banding of fertilizer, he may do so simply by pivoting the handle member 76 upwardly from the position shown in FIG. 1 to the position shown in FIG. 3 to disengage the drive gear 70 from the driven gear 58.

The meter assembly 10 is hingedly connected to the meter and hopper support structure 12 by a horizontal pivot 100 resting on a pair of U-shaped brackets 102. The opposite end of the meter assembly 10 is held in the position shown in FIGS. 1 and 2 by a pair of over center latches 106 having hooked lower ends 108 which are received in slots 110 in the meter assembly 10. For servicing, the meter 10 can be swung downwardly about the pivot 100 (FIG. 3) by releasing the latches 106 and removing the hooked ends 108 from the slots 110. The operator allows the meter assembly 10 to rock downwardly about the pivot 100 to the generally upright position shown in FIG. 3 wherein the assembly is supported from the frame at a location offset with respect to the hopper discharge area 18. The meter assembly 10 opens outwardly so the operator has unencumbered access to the feed rolls 50 and 52 and discharge area 18 without lifting the assembly from the brackets 102. Once the meter assembly 10 is swung to the position shown in FIG. 3, the operator can completely remove it from the implement by lifting the pivot 100 from the brackets 102. If any material remains in the compartments 20 and 22, slide structure (not shown) is inserted in a slot 112 (FIG. 2) to close the discharge area 18 and to prevent the material from falling to the ground as the meter assembly is swung downwardly. The hoppers 20 and 22 may be easily emptied by removing the slide structure to allow the grain and/or fertilizer to flow into a container or the like positioned below the discharge area 18.

As best seen in FIGS. 1 and 2, the drive gear 70 and the driven gear 58 are located inwardly of the horizontal pivot 100 (that is, to the right of the pivot as viewed in FIG. 2), and the gears are aligned vertically and rotate about parallel but offset axes when the meter assembly 10 is latched in the operating position. When the handle member 76 is in the down or operative position shown in FIG. 1, the drive gear 70 and driven gear 58 mesh. As the meter assembly 10 is swung downwardly about the pivot 100, the gears disengage automatically to remove drive from the feed rolls 50 and 52. When the meter assembly 10 is pivoted back to its operating position, the driven gear 58 automatically moves into driving relationship with the drive gear 70. The end 108 of each latch 106 is engaged in the corresponding slot 110 and the latch is lifted upwardly to its over center position to lock the meter assembly 10 under the support structure 12.

Having described the preferred embodiment, it will be apparent that modifications can be made without departing from the scope of the invention as defined in the accompanying claims.

We claim:

1. In an agricultural implement having a frame and a material hopper opening into a discharge area, a meter assembly comprising:

a housing having first and second ends and defining material input and output sections;

metering structure journalled for rotation in the housing between the input and output sections;

means hingedly connecting the first end of the housing to the frame for permitting the housing to swing between an operating position wherein the input section of the housing is closely adjacent the hopper discharge area, and a service position wherein the input section is removed from the discharge area, said means hingedly connecting including horizontal pivot means offset from the hopper discharge area for supporting the housing in a horizontal attitude in the operating position and a vertical attitude in the service position, wherein in the service position the housing is suppported from the frame at a location offset with respect to the hopper discharge area and opens generally outwardly for substantially unencumbered access to the metering structure;

means for releasably securing the housing in the operating position; and drive means operable when the housing is in the operating position to rotate the metering structure for metering material from the discharge area to the output section, said drive means comprising a driven gear journalled for rotation in, and swingable with, the housing, and a drive gear journalled for rotation on the frame between the horizontal pivot means and the hopper discharge area, said gears so located that when the housing is in the operating position, the drive and driven gears are in driving relationship with each other, and as the housing is swung away from the operating position the driven gear moves to a non-driving relationship with respect to the drive gear.

2. The invention as set forth in claim 1 wherein the axis of rotation of the drive and driven gears are parallel and offset with respect to each other.

3. The invention as set forth in claim 1 wherein the drive gear is journalled for rotation in a bearing member, said drive means further including adjustable support means movably connected to the implement frame for selectively supporting the bearing member in a first or a second position with respect to said frame, wherein when the housing is in the operating position and the bearing member is in the first position the gears are engaged, and when the bearing member is in the second position the gears are disengaged.

4. The invention as set forth in claim 3 wherein the driven gear is located between the first and second ends of the housing.

5. The invention as set forth in claim 1 wherein the means releasably securing comprises an over center latch.

6. The invention as set forth in claim 3 wherein the adjustable support means comprises a lever pivotally connected to the implement frame, said drive means further comprising a drive shaft having one end rotatably supported in the bearing and mounting the drive gear and wherein the opposite end of the drive shaft is drivingly connected to power means for rotating the shaft and drive gear.

7. The invention as set forth in claim 1 wherein the means hingedly connecting includes a U-shaped bracket connected to the frame and opening upwardly, and wherein said horizontal pivot means is received within the bracket and permits the released housing to be lifted from the frame.

8. In a framed agricultural implement having a material hopper opening into a discharge area, a meter assembly comprising:
 a housing having first and second ends and defining material input and output sections;
 metering structure journalled for rotation in the housing between the input and output sections;
 means hingedly connecting the first end of the housing to the frame for permitting the housing to swing between an operating position wherein the input section of the housing is closely adjacent the hopper discharge area, and a service position wherein the input section is removed from the discharge area;
 means for releasably securing the housing in the operating position; and
 drive means operable when the housing is in the operating position to rotate the metering structure for metering material from the discharge area to the output section, said drive means including a drive shaft supported for rotation on the implement frame, a drive gear fixed on and rotatable with the drive shaft, a driven gear mounted for rotation with the metering structure, and means for moving the drive shaft generally transversely to its axis between a first position wherein the drive and driven gears mesh and a second position wherein said gears are non-meshing.

9. The invention as set forth in claim 8 wherein the driven gear is connected for movement with the housing between a driving position corresponding to the operating position of the housing, wherein when the drive gear is in the first position, the drive and driven gears are in driving relationship, and a non-driving position corresponding to the service position of the housing wherein the gears are in non-driving relationship.

10. In an implement having a downwardly opening hopper for containing granular material, a meter assembly comprising: support structure connected to the hopper adjacent the opening, a meter housing having an inlet and an outlet located below said inlet, a feed roll journalled for rotation in the housing between the inlet and the outlet for metering material therebetween, hinge structure pivotally connecting the meter housing to the suppport structure for rocking between an operating position and a service position, wherein in the operating position the inlet opens upwardly into the hopper opening and in the service position the inlet is located below and offset to one side of the hopper opening for substantially unencumbered access to the feed roll and hopper opening, a driven gear supported for rotation by the meter housing and drivingly connected to the feed roll, said driven gear rockable with said meter housing between a first position corresponding to the operating position of the housing and a second position corresponding to the service position of the housing, a drive gear supported for rotation on the support structure adjacent the housing, said drive gear so positioned with respect to the housing to automatically engage the driven gear when the latter is moved toward the first position and to automatically disengage the driven gear as the latter moves toward the second position, and means for releasably securing the meter housing in the operating position.

11. The invention as set forth in claim 10 wherein the meter housing includes a first end connected to the hinge structure and a second end offset from the first with the feed roll axis extending between said ends, and wherein the means for releasably securing the meter housing comprises an over center latch located adjacent the second end.

12. The invention as set forth in claim 11 wherein the hinge structure includes a horizontal pivot extending transversely to the feed roll axis, and the driven gear is located on the feed roll axis between the pivot and the second end.

13. The invention as set forth in claim 12 wherein the drive gear is supported on a drive shaft for rotation about an axis parallel to the feed roll axis, and further including means for moving the drive shaft transversely to its axis to disengage the drive gear from the driven gear when the meter housing is in the operating position.

14. In an agricultural implement having a frame and a material hopper opening into a discharge area, a meter assembly comprising:
 a housing having first and second ends and defining material input and output sections;
 metering structure journalled for rotation in the housing between the input and output sections;
 means hingedly connecting the first end of the housing to the frame for permitting the housing to swing between an operating position wherein the input section of the housing is closely adjacent the hopper discharge area, and a service position wherein the input section is removed from the discharge area;

means for releasably securing the housing in the operating position;

drive means operable when the housing is in the operating position to rotate the metering structure for metering material from the discharge area to the output section;

wherein the drive means comprises a driven gear journalled for rotation in, and swingable with, the housing, and a drive gear journalled for rotation on the frame between the horizontal pivot means and the hopper discharge area, said gears so located that when the housing is in the operating position, the drive and driven gears are in driving relationship with each other, and as the housing is swung away from the operating position the driven gear moves to a non-driving relationship with respect to the drive gear; and wherein the drive gear is journalled for rotation in a bearing member, said drive means further including adjustable support means movably connected to the implement frame for selectively supporting the bearing member in a first or a second position with respect to said frame, wherein when the housing is in the operating position and the bearing member is in the first position the gears are engaged, and when the bearing member is in the second position the gears are disengaged.

15. The invention as set forth in claim 14 wherein the axis of rotation of the drive and driven gears are parallel and offset with respect to each other.

16. The invention as set forth in claim 14 wherein the driven gear is located between the first and second ends of the housing.

17. The invention as set forth in claim 14 wherein the adjustable support means comprises a lever pivotally connected to the implement frame, said drive means further comprising a drive shaft having one end rotatably supported in the bearing and mounting the drive gear and wherein the opposite end of the drive shaft is drivingly connected to power means for rotating the shaft and drive gear.

18. The invention as set forth in claim 14 wherein the means hingedly connecting includes horizontal pivot means offset from the hopper discharge area for supporting the housing in a horizontal attitude in the operating position and a vertical attitude in the service position, and wherein in the service position the housing is supported from the frame at a location offset with respect to the hopper discharge area and opens generally outwardly for substantially unencumbered access to the metering structure.

19. The invention as set forth in claim 18 wherein the drive gear is located between the horizontal pivot means and the hopper discharge area.

20. The invention as set forth in claim 18 wherein the means hingedly connecting includes a U-shaped bracket connected to the frame and opening upwardly, and wherein said horizontal pivot means is received within the bracket and permits the released housing to be lifted from the frame.

21. In an agricultural implement having a frame and a material hopper opening into a discharge area, a meter assembly comprising:

a housing having first and second ends and defining material input and output sections;

metering structure journalled for rotation in the housing between the input and output sections;

means hingedly connecting the first end of the housing to the frame for permitting the housing to swing between an operating position wherein the input section of the housing is closely adjacent the hopper discharge area, and a service position wherein the input section is removed from the discharge area, said means hingedly connecting including horizontal pivot means offset from the hopper discharge area for supporting the housing in a horizontal attitude in the operating position and a vertical attitude in the service position, wherein in the service position the housing is supported from the frame at a location offset with respect to the hopper discharge area and opens generally outwardly for substantially unencumbered access to the metering structure, a U-shaped bracket connected to the frame and opening upwardly, and wherein said horizontal pivot means is received within the bracket and permits the released housing to be lifted from the frame;

means for releasably securing the housing in the operating position; and drive means operable when the housing is in the operating position to rotate the metering structure for metering material from the discharge area to the output section said drive means comprising a driven gear journalled for rotation in, and swingable with, the housing, and a drive gear journalled for rotation on the frame, said gears so located that when the housing is in the operating position, the drive and driven gears are in driving relationship with each other, and as the housing is swung away from the operating position the driven gear moves to a non-driving relationship with respect to the drive gear.

* * * * *